Figure 1:
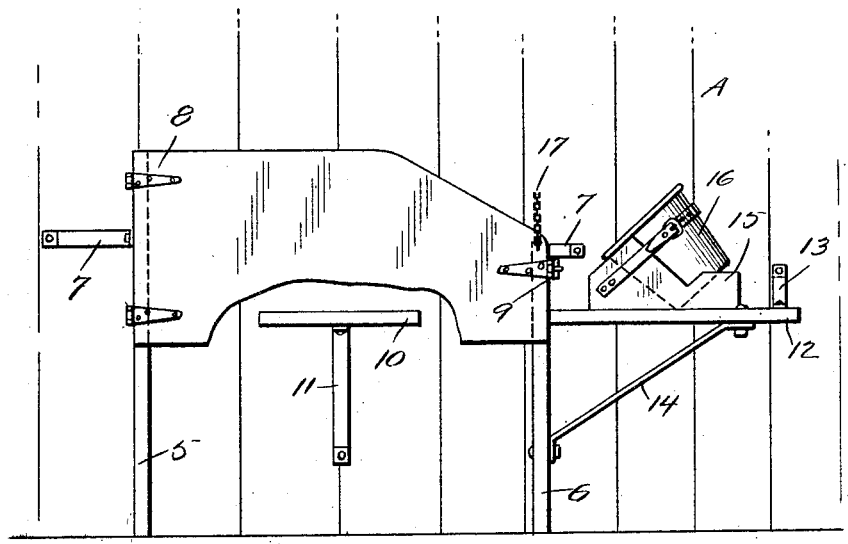

Dec. 9, 1924.                                                  1,518,553
D. M. BAIRD
ANIMAL FEEDING DEVICE
Filed Aug. 15, 1924

Inventor
David M. Baird.

By Clarence A. O'Brien
Attorney

Patented Dec. 9, 1924.

1,518,553

UNITED STATES PATENT OFFICE.

DAVID M. BAIRD, OF BELLE FOURCHE, SOUTH DAKOTA.

ANIMAL-FEEDING DEVICE.

Application filed August 15, 1924. Serial No. 732,199.

*To all whom it may concern:*

Be it known that I, DAVID M. BAIRD, a citizen of the United States, residing at Belle Fourche, in the county of Butte and State of South Dakota, have invented certain new and useful Improvements in an Animal-Feeding Device, of which the following is a specification.

This invention relates to animal feeding devices and has more particular reference to a feeding device for calves or other small animals wherein the same may be taught to drink in a short while and without experiencing the difficulty that is now occasioned in weaning small animals from their mothers.

The primary object of the invention resides in the provision of what may be termed a stall within which the animal is placed, said stall being directly adjacent a feed bucket that is anchored in position, the device effectively preventing the animal from lying down, kicking, or shaking its head which disadvantages are now experienced in weaning animals. It being at the present time generally necessary for one person to hold the animal while the other holds the bucket containing the milk which is a very difficult and laborious task.

A further object of the invention is to provide a device of this character wherein when the animal is disposed in the stall no further attention to the animal will be necessary and wherein the animal may be positioned within or removed from the stall in a simple and easy manner.

A further object is to provide an animal watering device that may be manufactured and marketed at extremely small cost and one wherein the liability of the same becoming out of order is reduced to a minimum.

With the foregoing and other objects in view as the nature of the invention will be better understood the same comprises the novel form, combination and arrangement of parts hereinafter more fully described, shown in the accompanying drawing and claimed.

Figure 2:
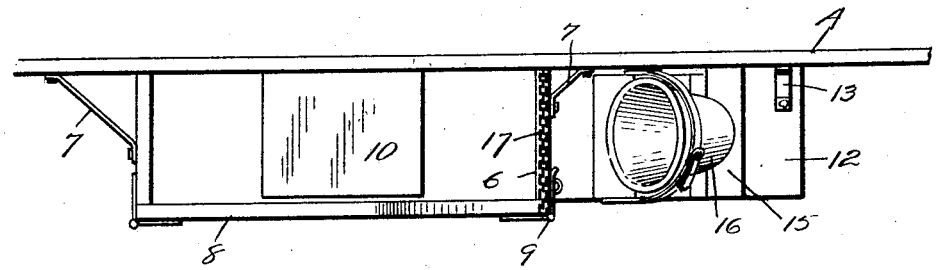

In the drawing wherein like reference characters indicate corresponding parts throughout both of the views:

Figure 1 is a front elevational view of an animal watering device constructed in accordance with the present invention, a portion of the hinged door of the aforementioned door member being partly broken away for more clearly disclosing the animal body supporting member which prevents the animal from lying down within the stall and obtaining freedom from the same, and Figure 2 is a top plan view of the device.

In carrying out the invention, it is preferable that the device be attached to the side wall of a barn or other suitable building which side wall of said barn or building affords one of the walls of the beforementioned stall, and in the drawing this wall of the barn is designated by the reference character A.

My invention per se constitutes the provision of a pair of spaced parallel and vertically extending standards 5 and 6, preferably in the form of boards that are secured at their inner side edges to the wall A through the medium of metal straps or other desirable fastening means 7. Hinged to the outer edge of the standards 5 and at the upper end thereof is a door 8 of a width substantially one-half the length of said standard 5 and that is adapted to be secured in closed position as at 9 to the upper end of the other standard 6 to prevent the animal from passing from the stall when the door is closed.

Secured to the barn wall A between said standards 5 and 6 and adjacent the lower edge of the door 8 is a laterally extending board or platform 10 secured to the barn wall through the medium of a brace bar 11. The length of this board is relatively small and it will be at once appreciated that when the animal is disposed within the stall said board or platform will engage between the front and rear legs thereof and obviously prevent the animal from lying down within the stall and which will also cooperate with the door 8 for preventing the animal from removing itself from said stall.

At the outer side of the standard 6 and adjacent the upper end thereof is a horizontally disposed supporting board or platform 12 that is secured to the building wall A as at 13 and to said standard 6 as at 14. Positioned upon this board or platform 12 is an inclined bucket support 15 upon which is adapted to be positioned a feed bucket 16, said support 15 carrying a suitable strap whereby the bucket may be secured rigidly thereto for preventing the same from being knocked from the support when the head of the animal strikes the interior thereof when feeding from the bucket. In order to maintain the head of the animal in close proximity to the bucket a chain 17 is provided which is anchored at one end to the wall A and adapted to be detachably connected to the door 8, this chain obviously being extended over the neck of the animal after he has been positioned within the stall.

It will thus be seen that I have provided a highly novel and simple form of feeding device for small animals and one wherein the use of which will effectively teach young animals to feed themselves.

Minor changes may be made in the invention without departing from the spirit and scope of the appended claim.

Having thus described the invention, what I claim as new and desire to secure by Letters Patent is:—

An animal feeding stall comprising spaced end walls, one of which is taller vertically than the other, a door hingedly connected with the taller wall and having its lower edge spaced from the lower edge of the said taller wall, the free edge of the door adapted to engage the shorter end wall, a flexible element carried by the door and adapted to be disposed above the upper end of the shorter wall, a fixed wall bridging the space between the end walls, a platform carried by the fixed wall and located between the end walls and above the lower edge of the door, and a board carried by the shorter end wall and having means for supporting a vessel in an inclined position.

In testimony whereof I affix my signature.

DAVID M. BAIRD.